May 22, 1956      A. COAN      2,746,481
WATER SUPPLY VALVE FOR POULTRY WATERING TROUGHS
Filed Jan. 20, 1954
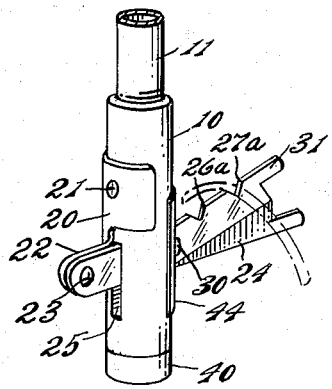
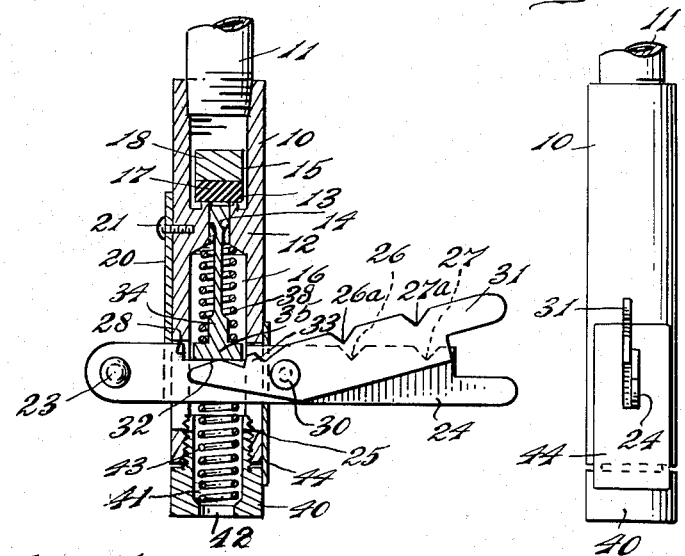
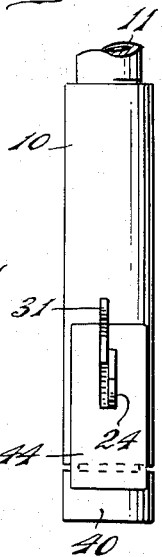
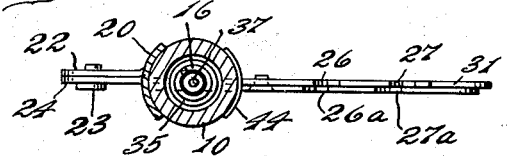
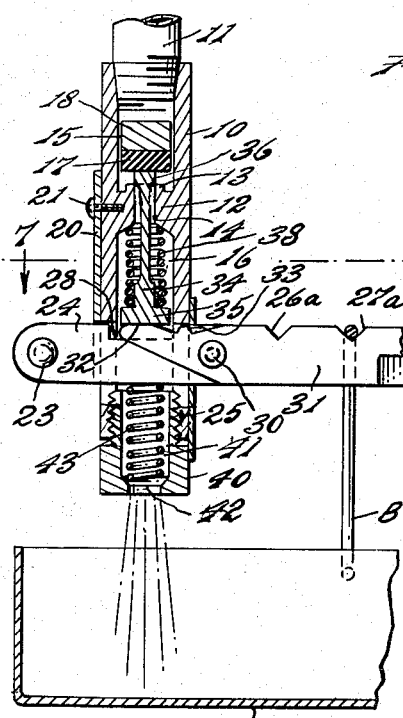
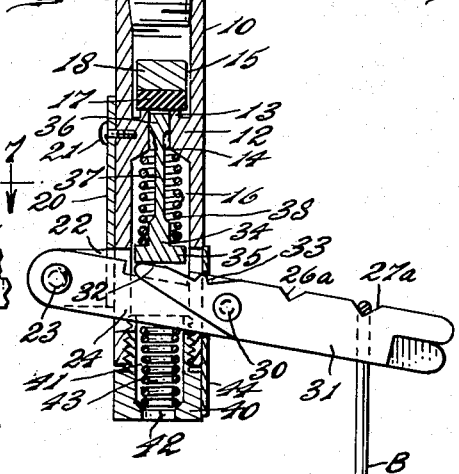
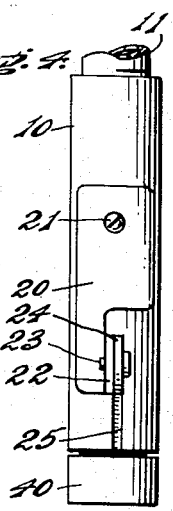
INVENTOR
*Abraham Coan*
BY
ATTORNEY United States Patent Office 2,746,481
Patented May 22, 1956

2,746,481

WATER SUPPLY VALVE FOR POULTRY WATERING TROUGHS

Abraham Coan, Solebury Township, Bucks County, Pa.

Application January 20, 1954, Serial No. 405,223

12 Claims. (Cl. 137—408)

This invention relates to water supply valves for poultry watering troughs.

Various supply valves have heretofore been proposed for poultry watering troughs but none of these has proven wholly satisfactory.

Double acting water valves now in use close against water pressure from the upper chamber exerted against a washer and weight. In normal use this pressure results in the valve rarely closing completely and there is a continual dripping which causes wetting of the litter in the poultry house with attendant unsanitary conditions and likelihood of disease.

With the double acting valves trouble is encountered with the bottom rubber gasket. Every time this gasket is pressed against the lower seat for closing by the weight of the water in the trough, there is a tendency to cutting and wear and pressing of dirt thereinto until it fails and requires replacement.

With the double acting valves also, in order to remove dirt above the upper valve seat, complete dismantling of the valve for cleaning is required.

Some of the valves now in use have a starting latch which must be adjusted if it is to operate properly for different weights of troughs. These valves use the same starting latch adjustment to regulate the depth of water in the trough thereby rendering the starting latch adjustment ineffective as soon as the valve is put into use.

A number of types of supply valves for poultry watering troughs have exposed parts which are picked off by the fowls with resultant operating difficulties. This is particularly true with turkey growers.

Certain supply valves available for poultry watering troughs have an excessively rapid or jet like discharge of the water with attendant undesired splash or spatter of the water.

It is the principal object of the present invention to provide an improved water supply valve for poultry watering troughs which is free from the objectionable features heretofore encountered in valves for the same or similar purposes.

It is a further object of the present invention to provide a water supply valve for poultry watering troughs in which the water pressure is effective at all times for aiding the closing of the valve so that any tendency to drip is eliminated.

It is a further object of the present invention to provide a water supply valve for poultry watering troughs in which a single valve is employed thereby eliminating the difficulties encountered with multiple seat valves.

It is a further object of the present invention to provide a water supply valve for poultry watering troughs having an actuating member which, if moved above its normal operating position provides for a large water flow and dirt flushing action.

It is a further object of the present invention to provide a water supply valve for poultry watering troughs which may be automatically or manually started, as desired, when a watering trough is mounted thereon.

It is a further object of the present invention to provide a water supply valve for poultry watering troughs which is free from the likelihood of dripping, which is simple in construction and which is self-cleaning.

It is a further object of the present invention to provide a water supply valve for poultry watering troughs in which the working parts are enclosed in a manner such that they cannot be picked off by the fowls.

It is a further object of the present invention to provide a water supply valve for poultry watering troughs in which the water flow may be quickly, easily and independently adjusted to obtain the desired level in the trough, and without interference with the setting of the starting latch or lever.

It is a further object of the present invention to provide a water supply valve for poultry watering troughs having a starting lever which does not have to be adjusted by the user.

It is a further object of the present invention to provide a water supply valve for poultry watering troughs which can be started with the trough mounted thereon and which will shut off if the trough is removed or falls off, or springs a leak or is tipped over but not off.

Other objects and advantageous features of the invention will be apparent from the specification and claims.

The nature and characteristic features of the invention will be more readily understood from the following description, taken in connection with the accompanying drawings forming part thereof, in which:

Figure 1 is a view in perspective of a preferred form of the supply valve in accordance with the present invention;

Fig. 2 is a vertical central sectional view of the valve shown in Fig. 1, in one of the closed or shut off positions;

Fig. 3 is a side elevational view of the valve as seen from the right of Fig. 2;

Fig. 4 is a side elevational view of the valve as seen from the left of Fig. 2;

Fig. 5 is a view similar to Fig. 2 showing the actuation of the starting lever;

Fig. 6 is a view similar to Fig. 2 showing the valve in the other of its shut off positions; and Fig. 7 is a horizontal sectional view taken approximately on the line 7—7 of Fig. 5.

It should, of course, be understood that the description and drawings herein are illustrative merely and that various modifications and changes can be made in the structure disclosed without departing from the spirit of the invention.

Like numerals refer to like parts throughout the several views.

Referring now more particularly to the drawings, the valve as therein shown, includes a substantially cylindrical valve body 10 with its longitudinal axis vertically disposed and with a water supply pipe 11 connected to the upper end thereof for delivery thereto of the water for the trough T. The water supply pipe 11 is connected to any suitable source of water under pressure.

Within the interior of the body 10, a partition wall 12 is provided having a valve seat 13 in the form of an annular rim extending upwardly from around a port 14. The partition wall 12 separates an upper chamber 15, in communication with the supply pipe 11, from a lower chamber 16.

A valve seating member 17, preferably of resilient material, such as rubber, natural or synthetic, is provided for seating on the valve seat 13 to close the port 14, and is urged to seated position by a weight 18.

The body 10 has a bracket 20 secured therein in any desired manner such as by a screw 21, and the bracket 20 has a radially outwardly extending arm 22. Pivotally mounted on the arm 22 by a pivot pin 23, which is preferably a rivet, an actuating lever 24 is provided. The lever 24 extends through a diametral slot 25 formed in the body 10 and beyond the body 10 is provided with a plurality of spaced notches 26 and 27 for the reception of a bail B of the trough T. The upper end of the slot 25 limits the upward movement of the lever 24. The bail B may be hooked into the outer notch 27 for a light trough or into the inner notch 26 for a heavy trough.

The lever 24 has a slot 28 in the upper edge thereof, and alined with the vertical axis of the chamber 16.

The lever 24 has pivotally connected thereto, by a pivot pin 30, such as a rivet, a starting lever 31. The pivot pin 30 is on the opposite side of the body 10 from the pivot pin 23. The starting lever 31 has notches 26a and 27a on the upper edge thereof, corresponding to the notches 26 and 27 and for alinement therewith. The starting lever 31, at the inner end thereof is provided with a cammed end 32 which in one position of the lever 31 is adapted to be alined with the slot 28 in the lever 24, as shown in Fig. 2, with the lever 31 angularly disposed above the lever 24, or above the slot 28, as shown in Figs. 5 and 6 with the lever 31 alined with the lever 24. The lever 31 has a recess 33 on the upper edge thereof.

Within the chamber 16, a valve actuator 34 is provided having an enlarged lower head 35, an upper end portion 36 movable in the port 14 for engagement with the valve seating member 17, and an intermediate stem portion 37 of reduced diameter to permit of free flow as hereinafter pointed out. A compression spring 38 is interposed between the partition wall 12 and the head 35 and urges the valve actuator 34 downwardly.

The lower portion of the body 10 is internally threaded for the reception of an adjustable screw plug 40 having a central bore 41 and a bottom opening 42. A compression spring 43, seated in the lower end of the bore 41 engages the lower edge of the lever 24 and urges the lever 24 upwardly.

The body 10 has, extending along and movable along the side thereof opposite the bracket 20, a splash shield 44 of light sheet metal. The splash shield 44 moves upwardly and downwardly with the lever 24, the recess 33 of the lever 31 permitting movement of the lever 31 without striking the shield 44.

The mode of operation will now be pointed out.

The valve of the present invention is particularly suited for poultry watering troughs T having a hinge mounting (not shown) at one end and a bail B or the like at the end adjacent the valve for supporting the other end of the trough T.

The valve is shown in Fig. 3 in one of its closed positions, with the valve seating member 17 in engagement with the seat 13 and closing the port 14. This is the condition when the valve is detached, or when no trough T is hooked thereon. It will be noted that seating of the valve seating member 17 is permitted by the positioning of the head 35 in the slot 28, which provides sufficient clearance downwardly for the valve actuator 34.

When it is desired to use the valve the bail B of an empty trough T is hooked over the appropriate notches 26 and 26a or 27 and 27a, depending on the unfilled weight of the trough T.

The weight of the trough T, applied on the starting lever 31, dependent upon the force of the spring 38, tends to move the starting lever downwardly towards the position shown in Fig. 5. If a light spring 38 is used, the lever 31 may be moved to a position parallel to the lever 24 so that no manual operation is required. Such a spring will not prevent operation if a tipped over trough T is hanging on the lever 31. If a heavier spring 38 is used, the lever 31 may require manual application of downward pressure for a very short time interval, of the order of a few seconds, to move the lever 31 to a position aligned with or parallel to the lever 24.

Upon downward movement of the starting lever 31 the cammed end 32 engages the head 35 and moves the valve actuator 34 upwardly, against the force of the spring 38, so that the valve seating member 17 is raised from its seat 13 to permit water to flow from the upper chamber 15 through the port 14, around the stem portion 37 and to the lower chamber 16 for discharge into the trough T.

As water is delivered to the trough T, the force applied through the bail B and downwardly on the lever 24 tends to move the levers 24 and 31 downwardly against the force exerted by the spring 43. Upon further downward movement of the levers 24 and 31 as illustrated in Fig. 6, the valve actuator 34 moves downwardly, urged by the spring 38 to a position such that the valve seating member 17 is seated on its seat 13 and flow is shut off.

If the weight of the water in the trough T is reduced, as by use, the levers 24 and 31 will swing upwardly together so as to move the valve seating member 17 from its seat 13 until sufficient weight of water has been added to the trough T to again move the levers 24 and 31 to the closed position shown in Fig. 6.

If the tank T should be knocked over, so that the levers 24 and 31 are released these levers will return to the positions shown in Fig. 2 with flow through the port 14 cut off by the valve seating member 17.

The adjustability of the position of the screw plug 40, and thereby of the force exerted by the spring 43 against the lever 24, in opposition to the force exerted by the weight of the tank T with water therein, permits of control of the shut off point of the valve seating member 17, so that the level of the water in the tank T may be controlled as desired.

It will be noted that when water is delivered through the port 14 and into the lower chamber 16, the velocity is reduced by the increase in size of the chamber, the contact with the spring 38 and the head 35, the contact with the levers 24 and 31, and the contact with the spring 43. The water will discharge downwardly through the central bore 41 and the opening 42 as well as sidewise through the slot 25 on both sides except as limited by the shield 44 and the lever 24. The paths for discharge as well as the cross sectional area thus provided for discharge eliminates any tendency to spray as well as any jet of water having a tendency to splash.

It will be noted that if the lever 31 is manually moved downwardly below the aligned position with respect to the lever 24, the valve actuator 34 may be moved upwardly, beyond its normal operating position and so that the stem portion 37 is above the valve seat 13 a free flow of water from the chamber 15 is available for flushing and removal of dirt in the chamber 15.

I claim:

1. In combination, a receptacle, a body portion, a connection to a source of water under pressure connected to said body portion, valve means in said body portion having a port with a valve seat at one end thereof for controlling the flow of water from said source to said receptacle, a valve member in said body portion for engagement with said seat, a plurality of valve control members to which said receptacle is connected and responsive to the weight of said receptacle in unfilled condition for moving one of said members towards a position to open said port and responsive to the weight of said receptacle in filled condition for moving both said members to a position for closing said port, and members in said body portion for urging each of said control members in opposition to the forces applied thereon from said receptacle.

2. The combination as defined in claim 1 in which one of said last members is adjustable for varying the force applied thereby.

3. The combination as defined in claim 1 in which the valve means includes a stem of smaller diameter than said port to permit of free flow of water.

4. In combination, a receptacle, a body portion, a connection to a source of water under pressure connected to said body portion, valve means in said body portion having a port with a valve seat at one end thereof for controlling the flow of water from said source to said receptacle, a valve member in said body portion for engagement with said seat, a plurality of valve control levers to which said receptacle is connected and responsive to the weight of said receptacle in unfilled condition for moving one of said members to a position to open said port and responsive to the weight of said receptacle in filled condition for moving both said members to a position for closing said port, and members in said body portion for urging each of said control levers in opposition to the forces applied thereon from said receptacle.

5. In combination, a receptacle, a body portion, a connection from a source of water under pressure connected to said body portion, valve means in said body portion for controlling the flow of water from said source to said receptacle, said valve means having a vertically disposed port, a valve member movable downwardly and normally closing the upper end of said port, valve control means to which said receptacle is connected, said control means including a first operating member having a portion movable in response to the application of the weight of receptacle thereon from a lower position for closing said port to an upper position to open said port, a second operating member movable with said first operating member in response to the application of a predetermined weight of the receptacle thereon to a position to close said port, and biasing members in said body portion for urging said operating members in opposition to the weight of said receptacle.

6. In combination, a receptacle, a body portion, a connection from a source of water under pressure connected to said body portion, valve means in said body portion for controlling the flow of water from said source to said receptacle, said valve means having a vertically disposed port, a valve member movable downwardly and normally closing the upper end of said port, valve control means to which said receptacle is connected, said control means including a first operating member movable in a predetermined direction in response to the application of the weight of the receptacle thereon from a position for closing said port to a position to open said port, a second operating member movable with said first operating member in the same direction in response to the application of a predetermined weight of the receptacle thereon to a position to close said port, and biasing members in said body portion for urging said operating members in opposition to the weight of said receptacle.

7. In combination, a receptacle, a connection from a source of water under pressure, valve means for controlling the flow of water from said source to said receptacle, said valve means having a vertically disposed port, a valve member movable downwardly and normally closing the upper end of said port, valve control means to which said receptacle is connected, said control means including a first operating lever movable in response to the application of the weight of receptacle thereon from a position for closing said port to a position to open said port, a second operating lever movable with said first operating lever in response to the application of a predetermined weight of the receptacle thereon to a position to close said port, an actuating member interposed between said levers and said valve member and having a portion extending through said port, and biasing members for urging said levers in opposition to the weight of said receptacle.

8. In combination, a receptacle, a connection from a source of water under pressure, valve means for controlling the flow of water from said source to said receptacle, said valve means having a vertically disposed port, a valve member normally closing the upper end of said port, valve control means to which said receptacle is connected, said control means including a first operating lever movable in a predetermined direction in response to the application of the weight of receptacle thereon from a position for closing said port to a position to open said port, a second operating lever movable with said first operating lever in the same direction in response to the application of a predetermined weight of the receptacle thereon to a position to close said port, an actuating member interposed between said levers and said valve member and having a portion extending through said port, and biasing members for urging said operating members in opposition to the weight of said receptacle.

9. A valve for poultry watering tanks comprising a body having a fluid inlet connection at the upper end thereof, an upwardly facing valve seat in the interior of said body, a valve seating member engageable with said seat, a movable control member mounted on said body, a member in said body for urging said control member to a predetermined position, a second control member movable with said first control member, a member in said body for urging said second control member to a position away from said first member, an actuating member interposed between said control members and said valve seating member and having a portion movable above said seat for moving said seating member to an open position, said second control member having a portion for engagement with said actuating member when said first member is in said predetermined position for opening said valve seating member, and said control members being movable downwardly to a position for permitting closing of said valve seating member.

10. A valve for poultry watering tanks comprising a body having a fluid inlet connection at the upper end thereof, an upwardly facing valve seat in the interior of said body, a valve seating member engageable with said seat, a control lever pivotally mounted on one side of said body and extending through said body, a member in said body for urging said control lever to a predetermined position, a second control lever pivotally mounted on said control lever on the opposite side of said body, a member in said body for urging said second control lever to a position angularly disposed upwardly with respect to said first lever, an actuating member interposed between said levers and said valve seating member and having a portion movable above said seat for moving said valve member to an open position, said second control lever having a portion for engagement with said actuating member when said first lever is in said predetermined position for opening said valve seating member, and said levers being movable downwardly to a position for permitting closing of said valve seating member.

11. A valve for poultry watering tanks comprising a vertical body having a fluid inlet connection at the upper end thereof, a partition wall in said body separating an upper chamber in communication with said inlet connection from a lower chamber, said wall having a port therethrough, a valve seating member in said upper chamber for closing said port, a control lever pivotally mounted on one side of said body and extending through said body and said lower chamber and extending beyond the other side of said body, a second control lever pivotally mounted on said first control lever on the other side of said body, said levers having portions for engagement by a member connected to the tank for applying the weight of the tank thereon, a valve actuator in said body interposed between said levers and said valve seating member, a resilient member in said body urging said valve actuator out of engagement with said valve seating member, said first lever having a recessed portion to permit movement of said valve actuator to close said port, said second lever having an inner end portion for engagement with said valve actuator to raise the same and open the port in one position, and said levers being movable downwardly together to permit downward movement of the valve actuator and closing of said port.

12. A valve for poultry watering tanks comprising a vertical body having a fluid inlet connection at the upper end thereof, a partition wall in said body separating an upper chamber in communication with said inlet connection from a lower chamber, said wall having a port therethrough, a valve seat on the upper side of said partition wall surrounding said port, a valve seating member in said upper chamber for engagement with said valve seat for closing said port, a control lever pivotally mounted on one side of said body and extending through said body and said lower chamber and extending beyond the other side of said body, an adjustable resilient member in said body for urging said lever upwardly, a second control lever pivotally mounted on said first control lever on the other side of said body, said levers having portions for engagement by a member connected to the tank for applying the weight of the tank thereon, a valve actuator in said body interposed between said levers and said valve seating member, a resilient member in said body urging said valve actuator out of engagement with said valve seating member, said first lever having a recessed portion to permit movement of said valve actuator to close said valve seating member, said second lever having an inner end portion for engagement with said valve actuator to raise the same and open the valve in one position, and said levers being movable downwardly together to permit downward movement of the valve actuator and closing of said valve seating member.

References Cited in the file of this patent

UNITED STATES PATENTS

| | | |
|---|---|---|
| 2,512,839 | Pruitt | June 27, 1950 |
| 2,619,123 | Martin | Nov. 25, 1952 |